Feb. 21, 1933.  D. G. LORRAINE  1,898,637
METHOD OF SEPARATING AND DELIVERING CASING HEAD GAS
Filed June 18, 1929
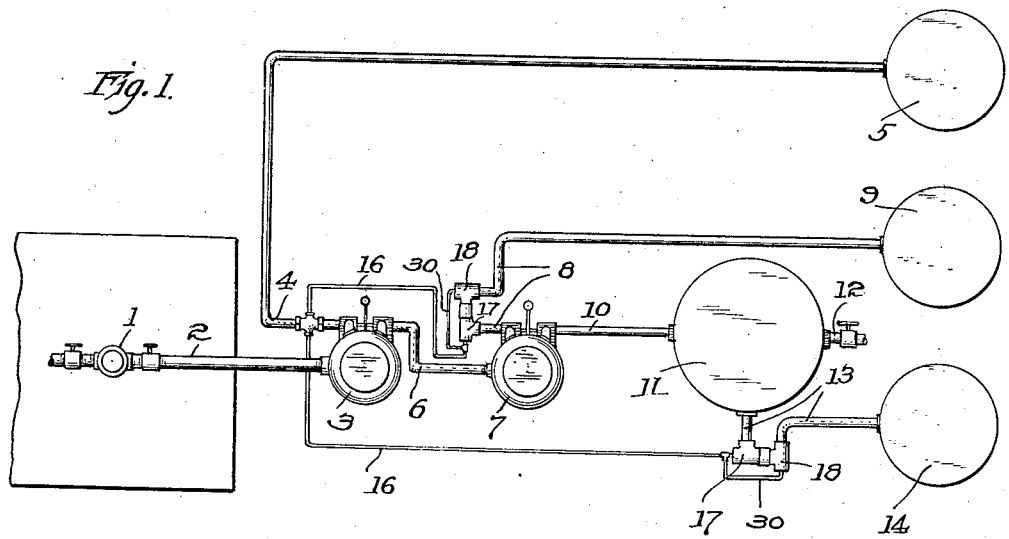
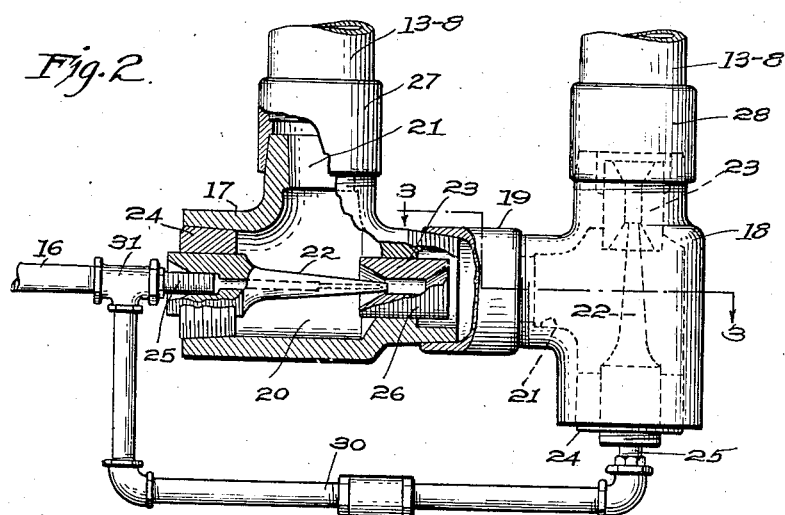
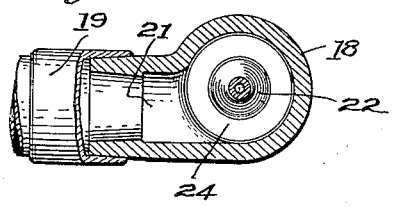
INVENTOR.
David G. Lorraine,
BY R. W. Smith
ATTORNEY.

Patented Feb. 21, 1933

1,898,637

UNITED STATES PATENT OFFICE

DAVID G. LORRAINE, OF LOS ANGELES, CALIFORNIA, ASSIGNOR TO LORRAINE CORPORATION, OF LOS ANGELES, CALIFORNIA, A CORPORATION OF NEVADA

METHOD OF SEPARATING AND DELIVERING CASING HEAD GAS

Application filed June 18, 1929. Serial No. 371,908.

This invention relates particularly to the delivery of casing head gas to a usual gasoline extraction plant, as has for its object to provide extremely simple and economical means for compressing the gas to the desired pressure for delivery to either the absorption towers or scrubbers of a usual extraction plant.

More particularly it is the object of the invention to employ the natural gas pressure of a well as an ejector for delivering casing head gas to a usual gasoline extraction plant at such pressure as will adapt it for extraction of gasoline by either the absorption or compression and refrigeration process, without the necessity of further compression or with but relatively little additional compression by the usual mechanical compressors.

Further objects of the invention will be readily understood from the following description of the accompanying drawing showing a preferred apparatus, and in which:

Fig. 1 is a plan view of the apparatus.

Fig. 2 is a detail plan view of the ejector, partly in axial section.

Fig. 3 is a transverse section on the line 3—3 of Fig. 2.

The invention is employed in connection with the delivery of casing head gas, and the natural pressure of the gas from a well provides a high pressure jet of relatively small volume for drawing off the relatively large volume of wet gas which separates from the oil discharged from the well, and the high pressure jet compresses this relatively large volume of wet gas to only a slightly less pressure such as is sufficient for delivery of the gas to a gasoline extraction plant for treatment therein in usual manner without the necessity of any further compression of the gas or with but little such additional compression.

The work required of usual mechanical compressors is thus eliminated or at least appreciably reduced, by using to the greatest advantage the natural gas pressure of the well.

The separation of the oil and wet gas so that the gas may be drawn off and delivered to an extraction plant may be by any usual system employing settling tanks or oil and gas separators or a combination of such elements, the illustrated embodiment of the invention showing the flow from a well discharged from the usual casing head 1 through a usual pipe line 2 to a high pressure gas trap 3, with the gas from the trap delivered through pipe 4 to the one unit of a usual gasoline extraction plant, as for example to absorption tower 5, and the oil from said trap delivered through pipe 6 to a low pressure gas trap 7. From trap 7 the gas flows through pipe 8 to a second unit of the extraction plant comprising the absorption tower 9, while the oil may be discharged through pipe 10 to a storage tank 11. From the storage tank the oil is withdrawn through pipe 12 for any desired use, while the gas collecting in the top of the tank may be discharged through pipe 13 to a third unit of the extraction plant indicated by its absorption tower 14.

The invention provides for utilizing the natural gas pressure from a well for delivery of the gas to the various absorption towers at approximately the pressure required for extraction of gasoline, and for this purpose the pressure of the gas from the well is adapted to form a high pressure jet for delivery to the extraction plant of the wet gas which has been separated from the oil, either by the specific arrangement of high and low pressure trap and storage tank such as described, or by any other usual system of oil and gas separation. In the illustrated embodiment of the invention the gas from trap 3 is under relatively high pressure corresponding to the natural pressure from the well so that the gas pressure from this trap may be used in suitable ejectors for respectively delivering gas from the low pressure trap 7 to absorption tower 9, and from storage tank 11 to absorption tower 14.

As an instance of this arrangement, the gas line 4 leading from the high pressure trap 3 is provided with branch conduits 16 leading to suitable ejectors which are provided in the pipes 8 and 13. One of these ejectors is shown in detail in Figs. 2 and 3, and is preferably a multiple-stage ejector comprising interchangeable ejector elements 17—18 detachably connected by a coupling 19 so as to form a two-stage ejector. Each of the ejector elements comprises a casing having an axial bore 20 and a lateral inlet 21, with a nozzle 22 extending into one end of bore 20, and a Venturi tube 23 preferably mounted in the opposite discharge end of bore 20 and surrounding the end of the nozzle. The nozzle is connected to conduit 16 so that a comparatively small volume of gas at relatively high pressure is discharged from the nozzle into Venturi tube 23, thereby drawing in a relatively large volume of fluid through inlet 21 and discharging the same through the Venturi tube at only slightly less pressure than that in the nozzle.

The inlet 21 is preferably arranged with its longitudinal axis to one side of the axis of its nozzle 22 as shown in Fig. 3, so that the induced fluid will move circumferentially around the nozzle for setting up a whirling action in the Venturi tube and thereby increasing the efficiency of the jet. The nozzle is preferably longitudinally adjustable with relation to its Venturi tube so that it may be regulated for maximum efficiency in accordance with the pressure of the jet, and for this purpose the nozzle may be threaded into a reduction plug 24 mounted in the end of the ejector casing, with the adjustable nozzle connected to the fixed conduit 16 by a nipple 25 having threaded engagement with the nozzle. The Venturi tube 23 is preferably also axially adjustable for regulating the jet in accordance with the available pressure, and for this purpose the Venturi tube may be threaded into the bore of the ejector element as shown at 26.

The ejector elements 17—18 which comprise the two-stage ejector are assembled with the inlet 21 of element 18 connected by the coupling 19 to the discharge end of the casing of element 17, and the pipe through which the induced flow is supplied to the ejector, and which in the illustrated embodiment of the invention is either pipe 8 or pipe 13, is connected to the inlet 21 of ejector element 17, as for example by coupling 27, and the discharge end of ejector element 18 is connected by a similar coupling 28 to that portion of either pipe 8 or 13 which leads to the corresponding absorption tower 9 or 14. The nozzles 22 for the two elements of the multiple-stage ejector may be connected by a branch conduit 30 which is coupled to conduit 16 by a union 31, and the jet of ejector element 17 is thus adapted to draw in a large volume of gas through its inlet 21 and discharge the same into element 18 at appreciable pressure, and the jet of element 18 will discharge this large volume of gas at an increased pressure determined by the pressure of the jet, so that the large volume of gas delivered through either pipe 8 or 13 will have a pressure only slightly less than that of the natural gas pressure of the jet, and the gas may thus be compressed to a degree adapting it for treatment in an extraction plant without the necessity of any or but little further compression by usual mechanical compressors.

The invention thus provides for separation and delivery of casing head gas by utilizing the natural gas pressure of a well for drawing off wet gas from the flow of oil and delivering the wet gas to a gasoline extraction plant at a pressure which eliminates or at least greatly reduces the necessity for further compression of the gas by usual mechanical compressors.

I claim:

1. The method of separating and delivering casing head gas from a mixture of gas and oil discharged under relatively high pressure from a well, which comprises separating the gas and oil while maintaining a relatively high pressure, collecting and settling the separated oil, and withdrawing a relatively large volume of lighter hydrocarbons from the collected oil by a jet comprising a relatively small volume of the initially separated and relatively high pressure gas.

2. The method of separating and delivering casing head gas from a mixture of gas and oil discharged under natural pressure from a well, which comprises separating the gas and oil while maintaining said natural pressure, collecting and settling the separated oil at a substantially reduced pressure, and withdrawing a relatively large volume of lighter hydrocarbons from the collected oil by a jet comprising a relatively small volume of the initially separated natural pressure gas.

In testimony whereof I have affixed my signature.

DAVID G. LORRAINE.